United States Patent [19]

Hashizume et al.

[11] Patent Number: 5,025,912
[45] Date of Patent: Jun. 25, 1991

[54] SHUTTLE TYPE CONVEYOR

[75] Inventors: Mitsuo Hashizume, Tsurugashima; Shoji Miyahara, Tokorozawa, both of Japan

[73] Assignee: Tsubakimoto Chain Co., Japan

[21] Appl. No.: 563,870

[22] Filed: Aug. 6, 1990

Related U.S. Application Data

[63] Continuation of Ser. No. 324,275, Mar. 15, 1989, abandoned.

[30] Foreign Application Priority Data

May 31, 1988 [JP] Japan .................. 63-71136[U]

[51] Int. Cl.$^5$ .................................. B65G 47/26
[52] U.S. Cl. .................. 198/459; 198/774.1; 414/750
[58] Field of Search ............ 198/459, 460, 750, 751, 198/773, 774.1, 774.2, 774.3, 774.4, 468.6; 414/750

[56] References Cited

U.S. PATENT DOCUMENTS

| | | | |
|---|---|---|---|
| 3,355,008 | 11/1967 | Milazza | 198/751 |
| 3,545,600 | 12/1970 | Rudlaff | 198/751 |
| 3,552,543 | 1/1971 | Manetta | 198/751 |
| 3,590,987 | 7/1971 | Evans et al. | 198/751 |
| 3,687,275 | 8/1972 | Broser | 198/751 |
| 4,236,626 | 12/1980 | Noe | 198/774 X |
| 4,240,542 | 12/1980 | Wiknich | 198/751 |
| 4,254,860 | 3/1981 | Koontz | 198/751 |
| 4,314,630 | 2/1982 | Greenwood, Jr. | 198/751 X |
| 4,441,606 | 4/1984 | Miller et al. | 198/751 |
| 4,971,508 | 11/1990 | Miyahara . | |

FOREIGN PATENT DOCUMENTS 0031423 2/1985 Japan .................. 198/774.1
61-188323 8/1986 Japan .

Primary Examiner—D. Glenn Dayoan
Attorney, Agent, or Firm—Howson and Howson

[57] ABSTRACT

A shuttle-type conveyor having a plurality of carriages connected to one another, arranged at a predetermined uniform pitch, and reciprocable along a path through the pitch distance, and a stationary rest extending along the conveyor path, each carriage has an independently operable lifting device. In the operation of the conveyor, if articles are deposited irregularly at an intake station on the rest, the independently operable lifting devices can be operated in such a way as to eliminate vacant spaces in the series of articles being advanced along the rest. This is accomplished by operating the lifting devices of the carriage or carriages behind the vacant space while temporarily disabling the lifting devices of the carriage corresponding to the vacant space and the carriage or carriages located ahead of the vacant space.

8 Claims, 6 Drawing Sheets

SHUTTLE TYPE CONVEYOR

CROSS REFERENCE TO RELATED APPLICATION

This is a continuation of our co-pending application U.S. Ser. No. 324,275, filed Mar. 15, 1989, and now abandoned.

BRIEF SUMMARY OF THE INVENTION

This invention relates to conveyors, and more specifically to a shuttle type conveyor used to convey articles along a conveying path by alternate, short advancing and retreating movements of the conveyor, wherein articles are indexed forward during the advancing movements and remain stationary on a rest during the retreating movements. Conveyors of this type have many uses, an example of which is the transportation of heavy articles such as metal coils in an iron works.

In the operation of conventional shuttle conveyors, the conveying mechanism reciprocates through a predetermined distance or "pitch". If the conveyed articles appear irregularly at the intake end of the conveyor, it is inevitable that vacant spaces will move forward along the conveyor path from time to time. These vacant spaces are undesirable, because they affect other operations in the processing of the conveyed articles. Thus, vacant spaces can reduce the efficiency and flexibility of a plant such as an iron works. Heretofore, no way has been found to place the conveyed articles closer together in order to eliminate these vacant spaces.

One form of conveyor which is commonly used in an iron works is the so-called "walking beam" conveyor. The walking beam conveyor utilizes a reciprocating carriage movable through a predetermined pitch and having a frame with multiple carrying members spaced from one another along the conveyor path by a distance equal to the pitch. The carriage moves underneath an elongated fixed rest, and is provided with a device for lifting and lowering the frame of the carriage so that several articles can be lifted simultaneously from the rest by the carrying members, carried forward, and redeposited on the rest. In each cycle of the walking beam conveyor, a plurality of articles are passed forward through a distance equal to the pitch of the carriage movement, as a result of the reciprocating movements of the carriage and the ascending and descending movements of the frame.

In the operation of the walking beam conveyor, if articles are not taken on sequentially at the intake end, vacant spaces will occur and will be carried forward through the conveyor path. It is not possible to eliminate these vacant spaces with the conventional walking beam conveyor.

Another form of conveyor is the "buffer storage conveyor" disclosed in Japanese laid-open patent application No. 188323/1986. With the buffer storage conveyor, it is possible to eliminate vacant spaces. However, it has the drawback that it utilizes pallets which must be circulated through a return path which requires additional space.

An important object of the present invention is to avoid the aforementioned drawbacks of prior conveyor systems, and particularly to provide a simple, inexpensive and effective means to eliminate vacant spaces in the conveyor path.

According to the invention, a shuttle-type conveyor is provided, comprising a plurality of carriages connected to one another and arranged at a predetermined uniform pitch, means for causing the carriages to reciprocate through the pitch distance, and a stationary rest extending along the conveyor path. The conveyor of the invention is characterized by the fact that each carriage has an independently operable lifting means, whereby vacant spaces can be eliminated.

In the operation of the conveyor of the invention, a first article situated on the stationary rest is lifted from the rest by the independently operable lifting device on a first carriage. The first carriage is advanced, together with the other carriages, through a distance equal to the pitch of the carriages. The carriages then stop, and the lifting device is lowered to deposit the article on the rest.

Thereafter, the first carriage returns to its original position, along with the other carriages, and stops underneath a second article received on the rest. At this time, a second carriage located just ahead of the first carriage is located underneath the rest and in a position to lift the first article.

Then, the first and second articles are simultaneously lifted, advanced through the pitch distance, and redeposited on the rest. In this manner, a series of carriages, each having an independently operable lifting device can cause a series of articles to be advanced along the rest in steps. If articles are deposited irregularly at the intake station of the rest, the independently operable lifting devices can be operated in such a way as to eliminate vacant spaces in the series of articles being advanced along the rest. This is accomplished by operating the lifting devices of the carriages behind the vacant space while temporarily disabling the lifting devices of the carriage or carriages corresponding to the vacant space and the lifting devices of the carriages located ahead of the vacant space. This operation may be carried out, for example, by conveying the article ahead of the vacant space all the way to the retracted position of the foremost carriage of the conveyor, and then disabling the lifting device on the foremost carriage so that the vacant space is filled. The lifting device on the carriage corresponding to the vacant space should normally be disabled also, in order not to interfere with the stationary article just ahead of the vacant space. A vacant space corresponding to two or more successive missing articles can be eliminated by disabling lifting devices for a number of conveyor cycles corresponding to the number of missing articles.

Further objects and advantages of the invention will be apparent from the following detailed description and the accompanying drawings.

DETAILED DESCRIPTION

Figure 5:
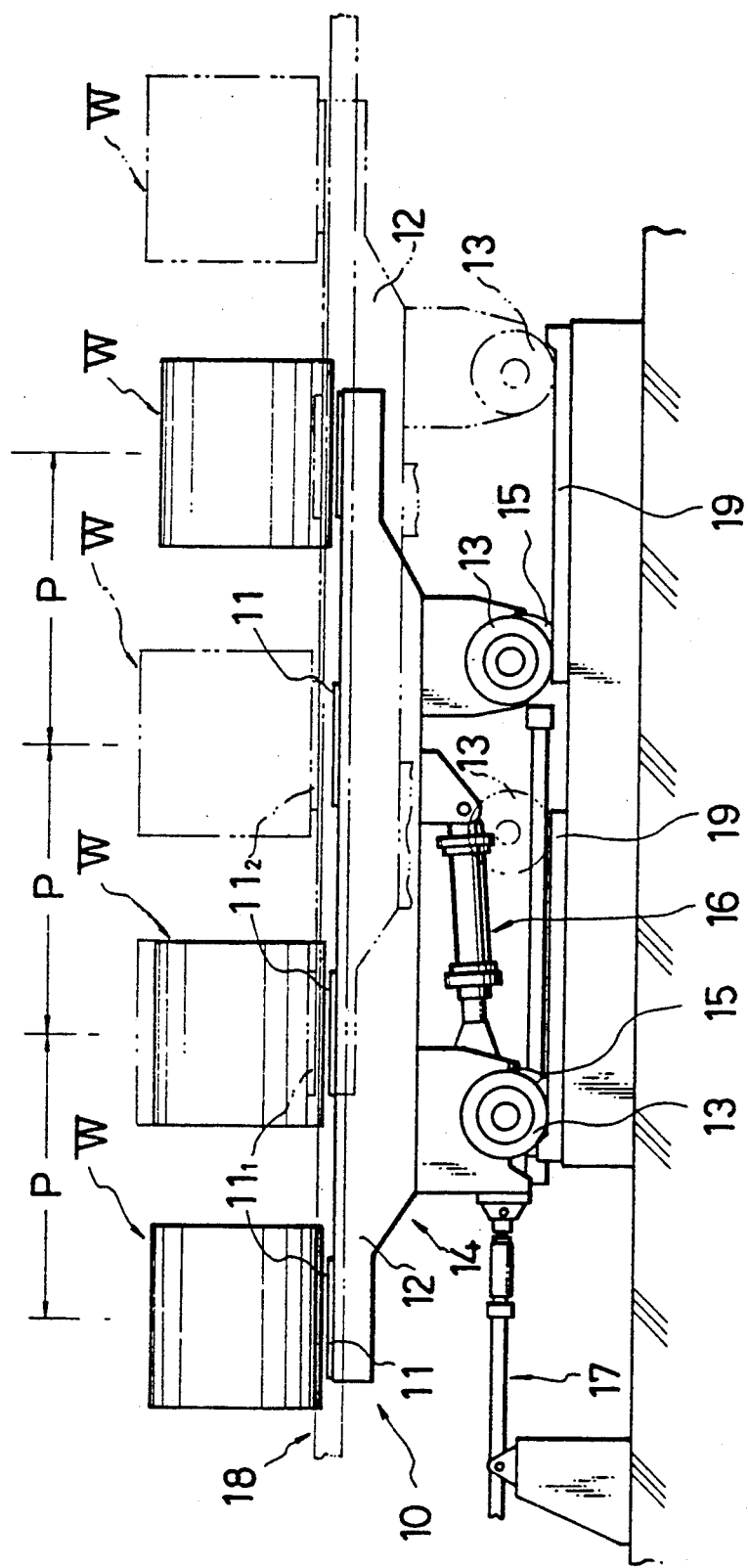
FIG. 5 is an elevational view of a typical walking beam conveyor in accordance with the prior art.
Figure 6:
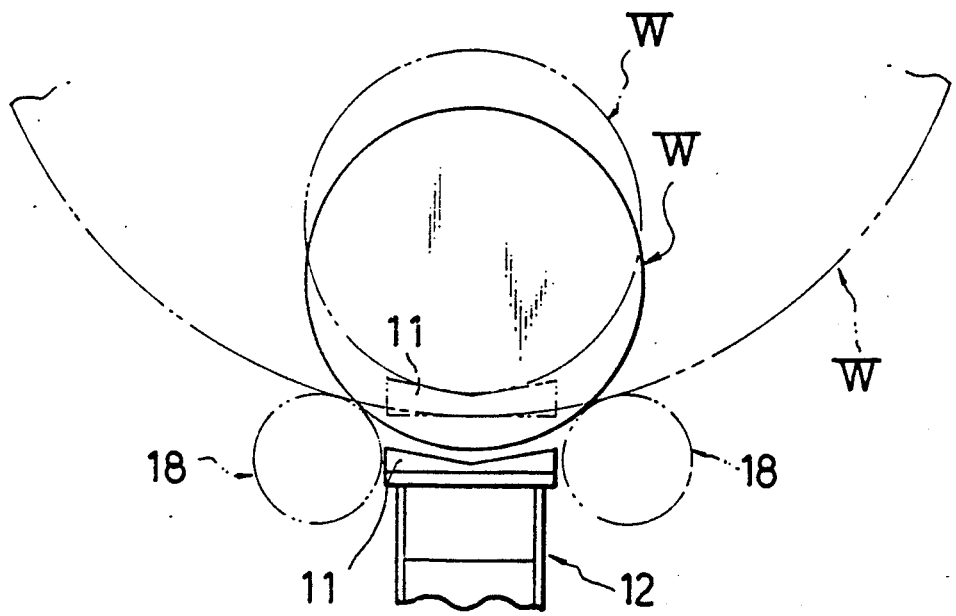
FIG. 6 is a fragmentary elevational view of the right-hand side of the apparatus of FIG. 5.

Referring first to FIGS. 5 and 6, the walking beam conveyor 10 comprises a carriage 14 having a frame 12 with a plurality of article-carrying members 11 arranged at a pitch P along the direction of movement of the conveyor. The carriage is provided with wheels 13, a lifting cam mechanism 16 having cams 15, and a driving mechanism 17 for advancing and retracting the carriage through a distance equal to pitch P. A stationary rest 18, typically comprising two parallel elongated beams as shown in FIG. 6, extends along the direction of movement of carriage 14.

Assuming the carriage 14 has stopped at the position indicated by the solid lines in FIG. 5, the frame 12 is lifted by means of the lifting cam mechanism 16 so that an article W (e.g. a metal coil), on rest 18 is lifted from the rest and supported by a first carrying member 11. The carriage 14 is then moved forward by the driving mechanism 17 through a distance P to the position indicated by the broken lines in FIG. 5. The carriage then stops at the forward position, and frame 12 is lowered to its original height by the lifting cam mechanism 16 in order to deposit the article W on rest 18 at a new position ahead of its original position by a distance equal to the pitch P. Carriage 14 is then returned to its original position in order to receive a next article W on its first carrying member 11. This next article is advanced in the same manner as the first article W. At the same time, the first article W is advanced through a second distance P by a second carrying member 11 on frame 12 of the carriage. In this manner, a plurality of articles W can be passed forward along the rest 18 by reciprocating movements of carriage 14 and ascending and descending movements of frame 12.

In the walking beam conveyor of FIG. 5, a plurality of carrying members 11 are provided on a single frame 12, and consequently a plurality of articles are raised and lowered simultaneously. If the carriage goes through a cycle without taking on a new article, a vacant space will occur between articles. In FIG. 5, for example, a vacant space exists between the rightmost article and the next article. No satisfactory way to eliminate such vacancies in a walking beam conveyor has been found. These vacancies inevitably affect operations at other stations in a plant, and can remarkably reduce flexibility of the entire plant operation.

Figure 1:
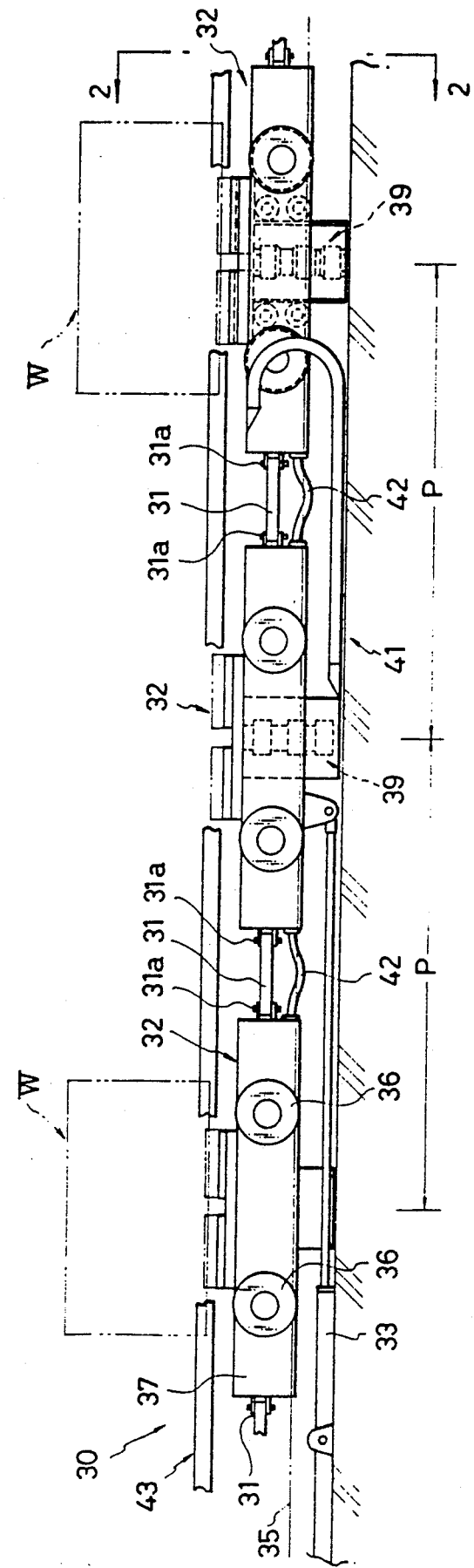
FIG. 1 is a fragmentary elevational view of a conveyor in accordance with a preferred embodiment of the invention.

Referring now to FIG. 1, the preferred shuttle-type conveyor 30 comprises a plurality of article-conveying carriages 32 connected together by connecting rods 31 and pins 31a so that the carriages are disposed at a predetermined uniform pitch P. The carriages are simultaneously driven in a reciprocating motion through the pitch distance P by a driving means 33 comprising a hydraulic cylinder.

Carriages 32 run on a pair of rails 35 along a shallow channel 34 (FIG. 2) formed in the ground G. Each of the carriages has a frame 37 and a hydraulic lifting mechanism 39 having a vertically movable support 38 capable of carrying articles W. Where the carried articles W are metal coils, as depicted in FIG. 2, the supports 38 desirably have concave upper surfaces in order to receive the coils without having them roll from side to side.

Figure 2:
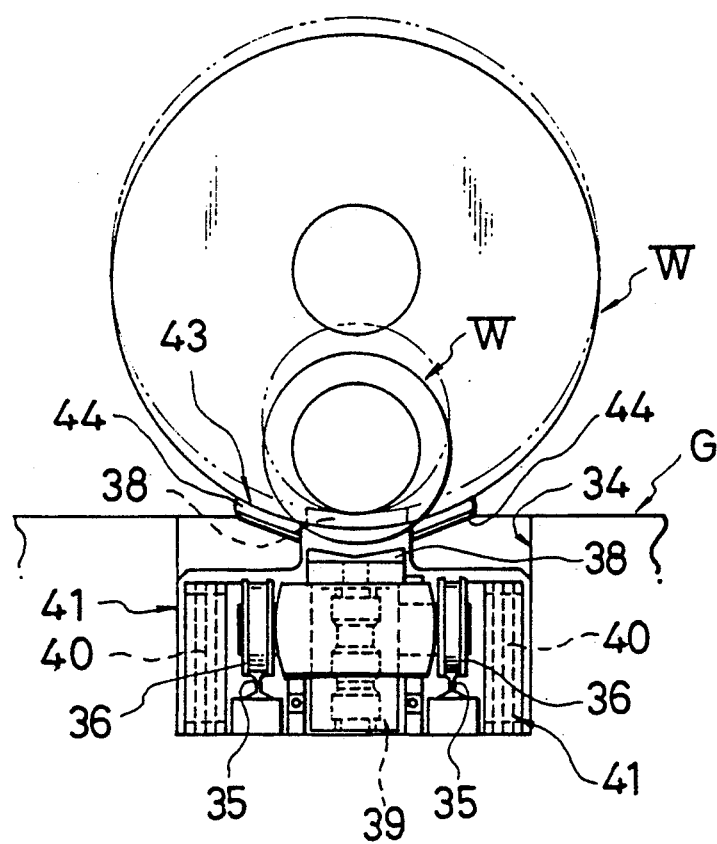
FIG. 2 is a sectional view through plane 2—2 of FIG. 1.

As shown in FIGS. 1 and 2, cables and hoses 40, for operating the lifting mechanism, are connected to the rightmost carriage 32 through a flexible sheath 41. The control signals from the cables 40 are transmitted to the other carriages 32 through connecting cables 42 extending between the carriages.

Along the conveying path there is provided a pair of plates 44 on opposite sides of the coil supports 38. These plates together constitute a fixed rest 43 which is designed to support the conveyed articles. In the case of metal coils, the upper faces of the plates slope downwardly and inwardly in order to provide stable support for the coils.

Figure 3A:
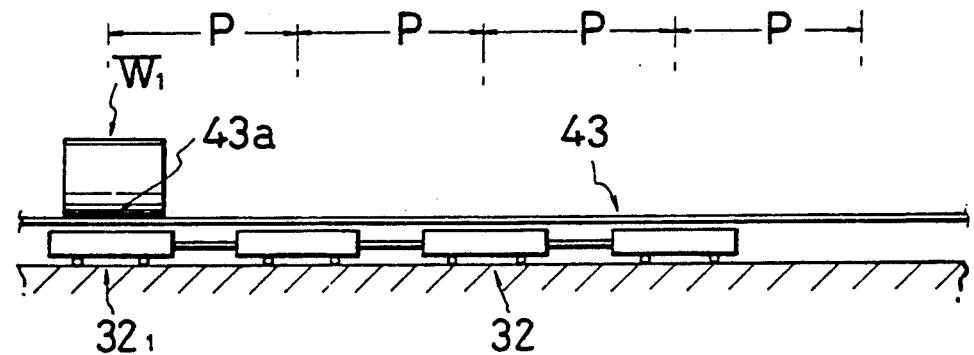
FIGS. 3A–3D are schematic views illustrating conventional operation of the conveyor of the invention.

Referring to FIGS. 3A–3D, which illustrate the normal function of the conveyor, the first carriage 32 is shown situated beneath an intake position 43a on the fixed rest 43. After the first article $W_1$ arrives at position 43a, as shown in FIG. 3A, the lifting mechanism 39 (FIGS. 1 and 2) of the first carriage $32_1$ is operated to lift article $W_1$ from the fixed rest.

Figure 3B:
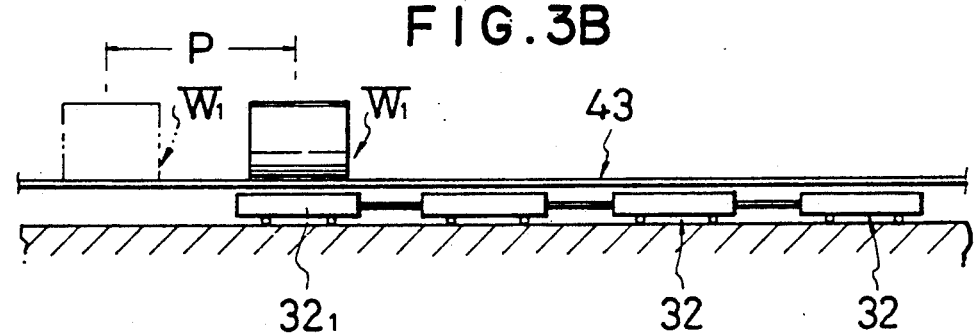

The driving means 33 then advances all of the carriages together through the pitch distance P. The article $W_1$ is therefore advanced by the pitch distance, as shown in FIG. 3B. The article support 38 is lowered in order to place the article $W_1$ on the fixed rest at the new position.

Figure 3C:
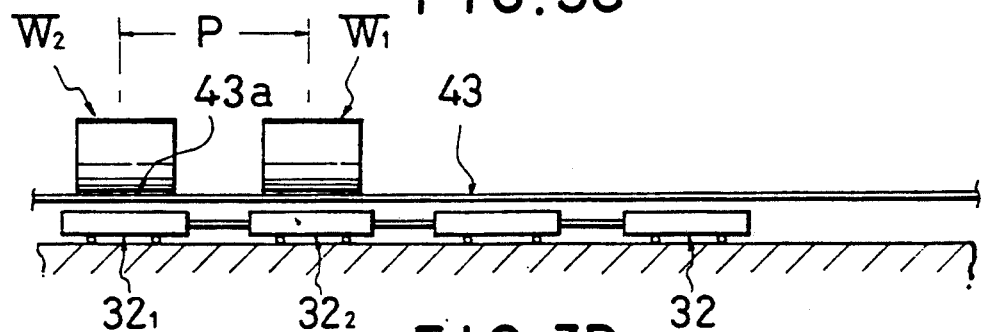
Figure 3D:
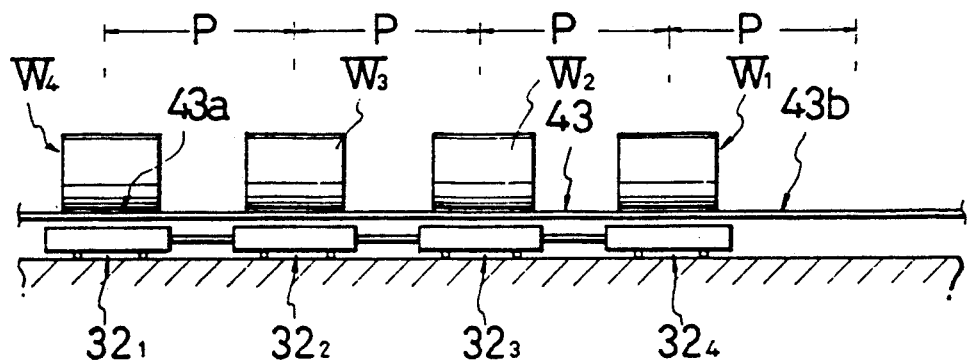

The carriage $32_1$ is then returned to its original position by the driving means 33 and is thereby brought underneath another article $W_2$ which has arrived at the intake position, as shown in FIG. 3C. At this time, the other carriages 32 are also returned to their respective original positions. Thus, the second carriage $32_2$ is brought underneath the first article $W_1$.

The lifting mechanisms 39 of the first and second carriages $32_1$ and $32_2$ are operated so that their article supports 38 support articles $W_2$ and $W_1$ respectively. The carriages are again driven forward through the pitch distance P, and the article supports are lowered to place the articles $W_1$ and $W_2$ on the fixed rest 43 so that article $W_2$ is spaced from the intake position by the pitch distance P, and article $W_1$ is located twice the pitch distance from the intake position.

The carriages are again returned to their original positions and the first carriage $32_1$ is brought underneath a third article $W_3$ at the intake position, and the second carriage $32_2$ is brought underneath the second article $W_2$. The third carriage $32_3$ is, at the same time, brought underneath article $W_1$.

Thereafter, a plurality of articles are sequentially advanced by the pitch distance P in each cycle of reciprocation of the carriages, by virtue of the coordinated ascending and descending movements of the lifting means 39 on the carriages. Coils are sequentially deposited on the fixed rest 43 at a take-out position 43b, shown in FIG. 3D, from which they are sequentially removed by a lifting mechanism or by another conveyor (not shown). The reciprocating conveyor can be operated either continuously or intermittently, and it can be operated in accordance with instructions given automatically by control apparatus responsive to conditions at the take-out end of the conveyor.

If the appearance of articles at the intake end of the conveyor is interrupted, vacancies in the sequence of articles appearing at the take-out end of the conveyor can be eliminated by advancing the foremost article W to the take-out position 43b so that the article can be removed from the take-out position as soon as take-out instructions are received.

Figure 4A:
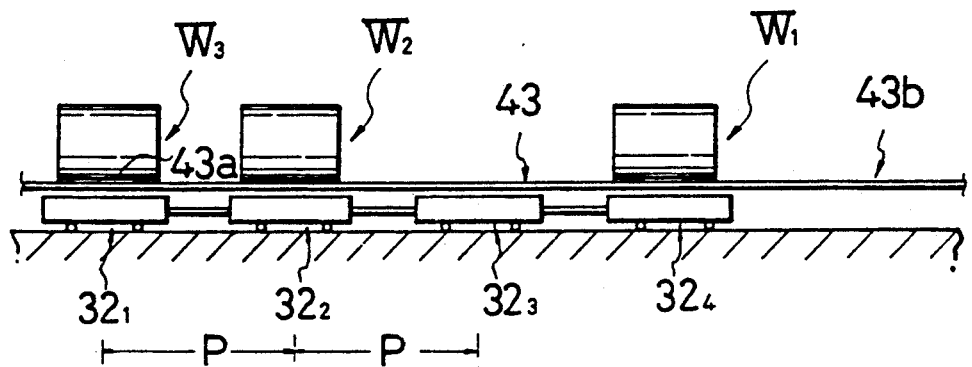
FIGS. 4A–4D are schematic views illustrating the manner in which vacancies are eliminated.

Referring to FIG. 4A, assume that a vacancy exists between the first and second articles $W_1$ and $W_2$. The article supports 38 of the second and first carriages $32_1$ and $32_2$ are raised, and articles $W_3$ and $W_2$ are lifted.

Figure 4B:
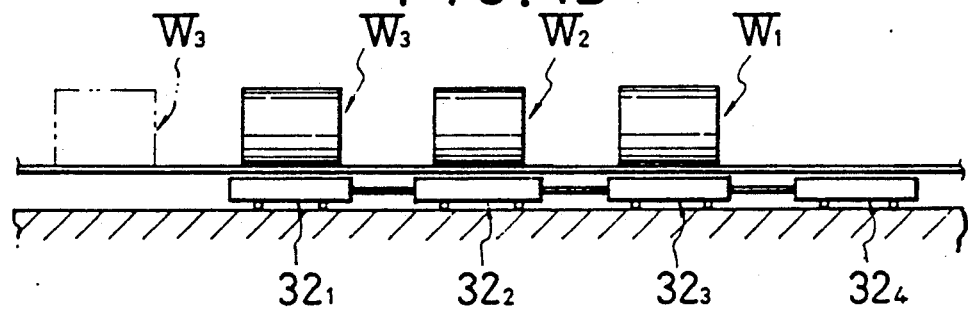
Figure 4C:
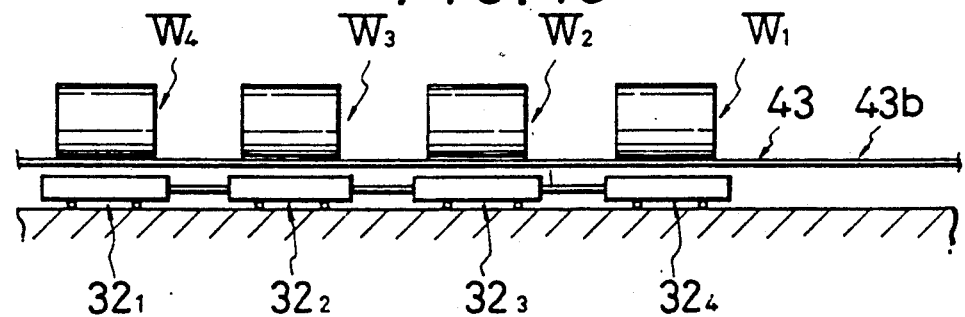
Figure 4D:
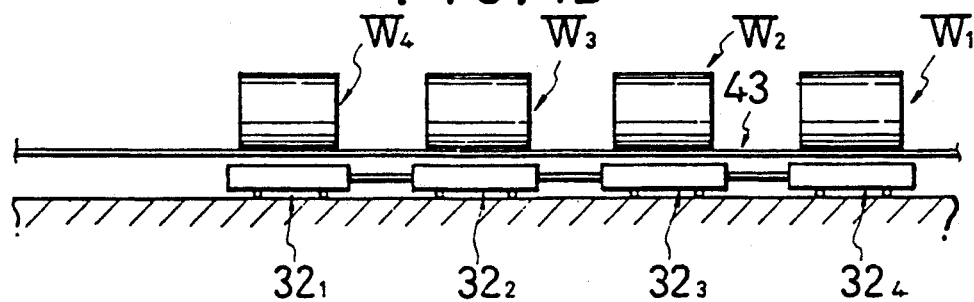

Carriages $32_1$ and $32_2$ are advanced through the pitch distance P together with the other carriages, and articles $W_3$ and $W_2$ are advanced and placed back on the rest 43 by lowering the article supports on carriages $32_1$ and $32_2$. The lifting means 39 on fourth carriage $32_4$, however, is not operated to raise the article support on that carriage. Article $W_1$ therefore remains on fixed rest 43, as shown in FIGS. 4A and 4B, while article $W_3$ is advanced to fill the vacant space. Thereafter, all of the carriages 32 are returned to their original positions, as shown in FIG. 4C. The articles are again advanced together, as shown in FIG. 4D, and the foremost article is thereby deposited at take-out position 43b, from which it can be removed when take-out instructions are received.

The number of carriages in the conveyor may be increased or decreased according to the number of articles to be handled and according to the distance through which they are to be conveyed. The conveying path may be curved, as the conveyor is made up of separate carriages connected flexibly by connecting rods 31 and pins 31a. In the case of a curved conveyor path it is desirable to provide guides, preferably in the form of rollers to restrict lateral movement of the carriages.

What is claimed is:

1. A shuttle type conveyor, for conveying a series of metal coils along a horizontal path of movement, comprising horizontal rail means, a series of at least three carriages connected together, said carriages being disposed at a predetermined uniform pitch along said rail means, and guided by said rail means for travel along said horizontal path of movement at a constant height, each of said carriages having an independently operable lift means carried thereby for supporting a metal coil on the carriage and for raising and lowering said metal coil relative to the carriage whereby each metal coil in the series being carried by said carriages can be raised independently of the metal coils ahead of it in the direction of movement of metal coils along said path, driving means for reciprocating said carriages along said horizontal path of movement through a distance equal to said pitch, and rest means extending along said path, said lift means being arranged to lift metal coils selectively from said rest means, and said driving means being arranged to index said metal coils along said rest means through the pitch distance, wherein the rest means comprises a pair of plates positioned, laterally of said path of movement, on opposite sides of said lift means, said plates extending lengthwise along said path of movement through substantially the full range of movement of said at least three carriages and having substantially flat, planar upper faces sloping downwardly and inwardly to provide a stable support for said coils.

2. A shuttle type conveyor according to claim 1 in which said carriages are connected together by coupling means permitting disconnection of the carriages from each other whereby the number of carriages in the conveyor may be increased or decreased according to the number of metal coils to be handled and according to the distance through which they are to be conveyed.

3. A shuttle type conveyor comprising a plurality of carriages connected together and disposed at a predetermined uniform pitch along a path of movement, each carriage having an independently operable lift means, driving means for reciprocating said carriages along said path of movement through a distance equal to said pitch, and rest means extending along said path, said lift means being arranged to lift articles selectively from said rest means and said driving means being arranged to index said articles along said rest means through the pitch distance, in which said carriages are connected together by flexible coupling means, whereby said carriages are capable of following a curved path of movement.

4. A shuttle type conveyor according to claim 3 in which said coupling means are detachable to permit disconnection of the carriages from each other whereby the number of carriages in the conveyor may be increased or decreased according to the number of articles to be handled and according to the distance through which they are to be conveyed.

5. A method of conveying metal coils along a path of movement extending from an intake station to a take-out station comprising the steps of effecting reciprocating movement of a series of interconnected carriages arranged at a uniform pitch along a horizontal path of movement extending from the intake station to the take-out station, the distance through which the carriages reciprocate being equal to said pitch, guiding said carriages by rail means along said path at a constant height while effecting said reciprocating movement, and, during said reciprocating movement of the carriages while the carriages are maintained at said constant height, repeatedly lifting said metal coils from a rest, said rest comprising plates located laterally on both sides of said path of movement, extending along said path of movement through substantially the full range of movement of said series of interconnected carriages, and having substantially flat, planar upper faces sloping downwardly and inwardly, by raising independently operable lifting means carried by said carriages while said carriages are in an initial position, simultaneously moving said carriages forward along said path through the pitch distance with the lifted metal coils carried thereby, redepositing the lifted metal coils on said rest and stably supporting the redeposited coils on said downwardly and inwardly sloping upper faces of said plates, and returning said carriages to said initial position, wherein a vacant space in the sequence of metal coils being conveyed along said path of movement is eliminated by operating the lifting means on at least one carriage behind the vacant space while temporarily disabling the lifting means on at least one carriage located ahead of a vacant carriage.

6. A method of conveying articles according to claim 5 in which, in the step of temporarily disabling the lifting means on at least one carriage located ahead of a vacant carriage includes the simultaneous temporary disabling of the lifting means on said vacant carriage.

7. A method of conveying articles along a path of movement extending from an intake station to a take-out station comprising the steps of effecting reciprocating movement of a series of interconnected carriages arranged at a uniform pitch along a horizontal path of movement extending from the intake station to the take-out station, the distance through which the carriages reciprocate being equal to said pitch, guiding said carriages by rail means along said path at a constant height while effecting said reciprocating movement, and, during said reciprocating movement of the carriages while the carriages are maintained at said constant height, repeatedly lifting articles from a rest extending along said path of movement by raising independently operable lifting means carried by said carriages while said carriages are in an initial position, simultaneously moving said carriages forward along said path through the pitch distance with the lifted articles carried thereby, redepositing the lifted articles on said rest, and returning said carriages to said initial position, wherein a vacant space in the sequence of articles being conveyed along said path of movement is eliminated by operating the lifting means on at least one carriage behind the vacant space while temporarily disabling the lifting means on at least one carriage located ahead of a vacant carriage, in which said path of movement is curved in a horizontal plane.

8. A method of conveying articles according to claim 7 in which, in the step of temporarily disabling the lifting means on at least one carriage located ahead of a vacant carriage includes the simultaneous temporary disabling of the lifting means on said vacant carriage.

* * * * *